(12) United States Patent
Schweizer et al.

(10) Patent No.: US 9,573,335 B2
(45) Date of Patent: Feb. 21, 2017

(54) QUICK COUPLING SYSTEM FOR FASTENING AN INTERCHANGEABLE HEAD ON A PRESS TOOL

(75) Inventors: Beat Schweizer, Titterten (CH); Martin Moritz, Landser (FR)

(73) Assignee: VON ARX AG, Sissach (CH)

( * ) Notice: Subject to any disclaimer, the term of this patent is extended or adjusted under 35 U.S.C. 154(b) by 347 days.

(21) Appl. No.: 14/343,705

(22) PCT Filed: May 11, 2012

(86) PCT No.: PCT/EP2012/058767
§ 371 (c)(1),
(2), (4) Date: May 6, 2014

(87) PCT Pub. No.: WO2012/171732
PCT Pub. Date: Dec. 20, 2012

(65) Prior Publication Data
US 2014/0239599 A1 Aug. 28, 2014

(30) Foreign Application Priority Data

Jun. 16, 2011 (CH) ........................ 1006/11
Jun. 16, 2011 (CH) ........................ 1007/11

(51) Int. Cl.
*B23B 31/107* (2006.01)
*B30B 15/02* (2006.01)

(52) U.S. Cl.
CPC ........ *B30B 15/026* (2013.01); *B23B 31/1071* (2013.01); *B23B 2231/0268* (2013.01);
(Continued)

(58) Field of Classification Search
CPC .............. B23B 31/1071; B23B 31/113; B23B 2231/0268; B23B 2231/26; B30B 15/026; Y10T 279/17752
See application file for complete search history.

(56) References Cited

U.S. PATENT DOCUMENTS 1,054,126 A * 2/1913 Lindberg ............ B23B 31/1071
279/75
2,255,333 A * 9/1941 Scheiwer ................ F16L 37/23
251/149.6
(Continued)

FOREIGN PATENT DOCUMENTS

CH 266696 A * 2/1950 ............. B23B 31/06
DE 813789 C * 9/1951 ......... B23B 31/1071
(Continued)

OTHER PUBLICATIONS

International Search Report dated Sep. 25, 2012 for PCT/EP2012/58767.
(Continued)

*Primary Examiner* — Eric A Gates
(74) *Attorney, Agent, or Firm* — Paul D. Bianco; Katharine Davis; Fleit Gibbons Gutman Bongini & Bianco PL

(57) ABSTRACT

Provided in a quick coupling system for fastening an interchangeable head to a pressing tool is a securing arrangement. The pressing tool has a press ram, which is movable in an axial direction, for actuating a pressing device in the interchangeable head. The quick coupling system has no thread and has either a bayonet closure or a securing arrangement having radially displaceable securing elements.

3 Claims, 2 Drawing Sheets

Figure 1:
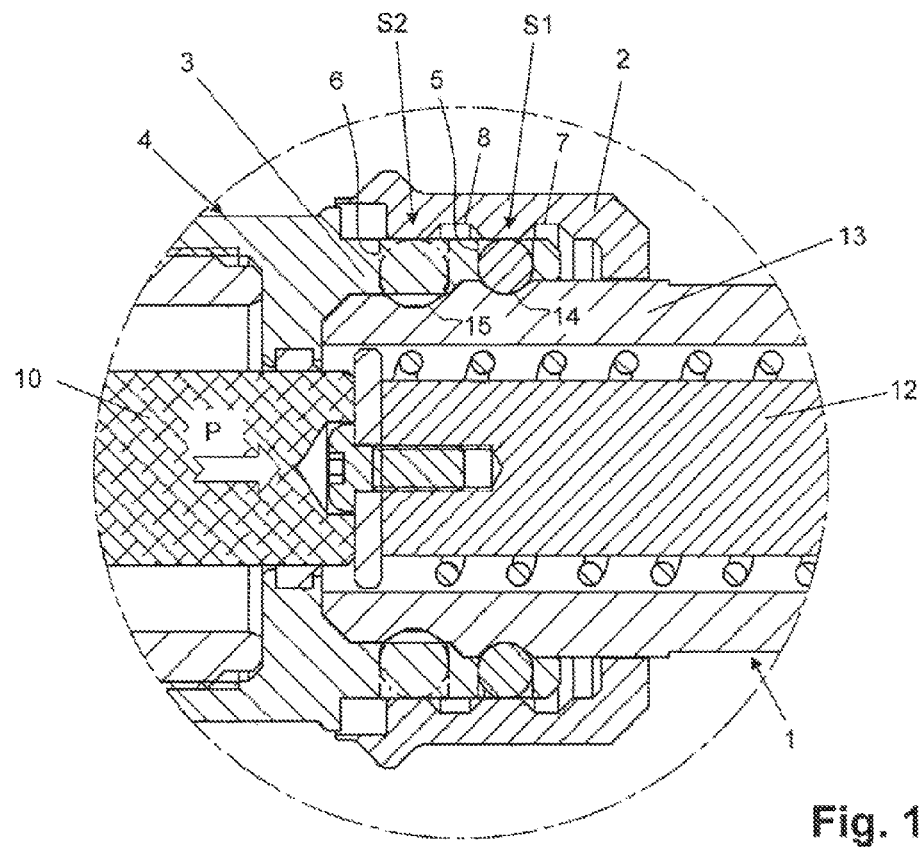

(52) U.S. Cl.
CPC .................. *Y10T 279/17666* (2015.01); *Y10T 279/17752* (2015.01)

(56) References Cited

U.S. PATENT DOCUMENTS

| | | | |
|---|---|---|---|
| 3,103,367 A * | 9/1963 | Peck | B21D 28/34 |
| | | | 173/132 |
| 3,583,715 A | 6/1971 | Jahrl | |
| 3,947,047 A | 3/1976 | Hultman | |
| 5,490,683 A * | 2/1996 | Mickel | A61B 17/162 |
| | | | 279/75 |
| 5,893,851 A * | 4/1999 | Umber | A61B 17/162 |
| | | | 279/75 |
| 5,911,421 A * | 6/1999 | Steele | B23B 31/202 |
| | | | 279/157 |
| 5,934,846 A * | 8/1999 | Ishii | B23B 31/008 |
| | | | 279/22 |
| 5,996,452 A * | 12/1999 | Chiang | B25B 15/001 |
| | | | 279/157 |
| 6,324,768 B1 | 12/2001 | Wellman | |
| 6,461,089 B2 | 10/2002 | Adrian et al. | |
| 6,511,268 B1 | 1/2003 | Vasudeva et al. | |
| 6,520,509 B1 | 2/2003 | Vasudeva et al. | |
| 6,718,870 B1 | 4/2004 | Frenken | |
| 6,722,667 B2 * | 4/2004 | Cantlon | B23B 31/06 |
| | | | 279/155 |
| 7,565,854 B2 * | 7/2009 | Chiang | B25B 15/001 |
| | | | 279/75 |
| 7,740,249 B1 * | 6/2010 | Gao | B23B 31/1071 |
| | | | 279/22 |
| 7,766,585 B2 * | 8/2010 | Vasudeva | B23B 31/005 |
| | | | 279/22 |
| 9,242,422 B2 * | 1/2016 | Schweizer | B23B 31/1071 |
| 2002/0017753 A1 | 2/2002 | Adrian et al. | |
| 2004/0161313 A1 | 8/2004 | Nordlin | |
| 2009/0160138 A1 * | 6/2009 | Bohne | B23B 31/1071 |
| | | | 279/30 |
| 2009/0290931 A1 * | 11/2009 | Blanchard | A01B 33/028 |
| | | | 403/204 |
| 2012/0319398 A1 * | 12/2012 | Schweizer | B23B 31/1071 |
| | | | 285/308 |

FOREIGN PATENT DOCUMENTS

| | | |
|---|---|---|
| DE | 2426760 | 1/1975 |
| DE | 20012706 | 9/2000 |
| DE | 10046869 | 4/2002 |
| DE | 202009010128 | 10/2009 |
| EP | 1084798 | 3/2001 |
| FR | 2649028 | 1/1991 |
| JP | 3-42199 | 2/1991 |

OTHER PUBLICATIONS

Written Opinion for PCT/EP2012/58767.
International Preliminary Report on Patentability dated Dec. 17, 2013 for PCT/EP2012/58767.

* cited by examiner

QUICK COUPLING SYSTEM FOR FASTENING AN INTERCHANGEABLE HEAD ON A PRESS TOOL

The invention relates to a quick coupling system for fastening an interchangeable head on a press tool according to Patent claim 1.

Press devices are used for various purposes, including pressing cable connectors onto electric cables for example. As, owing to the multiplicity of possible diameters for electric cables, there is also a requirement for a multiplicity of cable connectors fitting the same, the press device to be used for the pressing of the cable connectors must also be equipped or be able to be equipped with a press head which is suitable for the various sizes of cable connector to be used. If exchangeable press heads are used, then these are simply designated in a simplified manner as exchangeable heads in the following. Thus, if required, one can quickly and easily convert to other cable-connector sizes using the same press device and with various exchangeable heads. Furthermore, with an exchangeable-head system one can also easily convert to other tool or adapter systems, such as for example to cable-cutting or stamping tools.

The longitudinal forces, that is to say the pressing forces generated by the press devices, to be transmitted are however a particular problem with press devices with exchangeable heads, because the coupling mechanism, using which the exchangeable head is fastened on the press device, must of course withstand these forces and the corresponding safety requirements are relatively high. Usually, the problem of fastening the exchangeable heads on press devices is therefore solved with screw connections. Screw connections have the advantage, in particular if many threads are engaged, that the very high longitudinal forces can be caught securely and that in many cases, the risk of an unintentional loosening in the pressure-loaded state is virtually non-existent. Namely, it appears extremely unlikely that the screw connection used loosens by several threads at once due to vibrations without it being noticed. For reasons of safety technology, the screw connection is currently therefore the customary technical solution for fastening exchangeable heads on press devices.

An example of such a solution with a screw-on exchangeable head is disclosed in EP-1 084 798. The publication shows a hydraulic manual press device with a relatively long screw-on threaded part for fastening the exchangeable head on the manual press device.

The high operational safety in the case of EP-1 084 798 comes at the cost of relatively cumbersome and time-consuming exchangeability, however. Doubtless, in modern work environments it is a disadvantage if the exchanging of an exchangeable head takes up a lot of time, in particular if it must take place frequently. Because safety aspects rightly always are and have been highly regarded, one also barely has/had a reason to deviate from this proven connection concept in the case of press devices with exchangeable heads. Although quick coupling systems are also exceptionally desirable in the case of press devices, this is of course only if safety is ensured to the same degree.

It is therefore the object of the present invention to specify a quick coupling system for fastening an exchangeable head on a press tool which ensures quicker exchangeability whilst maintaining high operational safety.

This object is achieved by means of the features of Patent claim 1.

The solution originates from the consideration that the presence of a thread is not necessarily the only possibility for producing the connection between the press tool and exchangeable head, in order to ensure a satisfactorily high connection security. Other systems, which for example use a bayonet closure or a securing-means arrangement with radially displaceable securing means, can offer the same degree of connection security. Of course, this is very dependent in the individual case on how the securing-means arrangement is configured and dimensioned, particularly in the case of the last-mentioned solution variant. The main advantage however consists in the fact that dispensing with a thread for producing the connection between the press tool and exchangeable head essentially allows the realisation of a real quick coupling system for the first time.

Primarily, though not exclusively, the present invention is concerned with solutions in which radially displaceable securing means are used. Therefore, the securing measures to be provided for this case are also assigned a high importance.

Fundamentally, it is to be assumed that in the case of systems with radially displaceable securing means, there is a multiplicity of possible individual technical solutions. All of these individual solutions are based on the basic principle however, that only one clear multiplication of the radially displaceable securing means to be provided offers the required operational safety, especially in the case of high pressures. At the same time, this of course also means that all possibilities for incorrect assembly which could possibly result undesirably and unintentionally for design reasons must be prevented. Incorrect assembly is understood in the following as an assembled state in which not all radially displaceable securing means present successfully reach engagement. Defective designs could lead to this nonetheless being possible. Defective assemblies would of course not be satisfactory in terms of safety technology and are therefore to be avoided. This can fundamentally be achieved using design measures or with notices on the device. With regards to the latter, it is of course to be noted that provision is generally to be made for using design measures to completely prevent incorrect assembly and the possibility of commissioning with incorrect assembly, as simply displaying an incorrect assembly may not receive satisfactory attention in the case of a hurried working method and then lead to accidents in spite of this.

Nevertheless, it of course makes sense, even in the case of a press tool which cannot be incorrectly assembled at all, to have a notification which makes the user aware that everything is correctly assembled and that safety is also ensured. Indication devices of this type are very simple to realise and probably even have a trust-building action which is not to be underestimated.

The multiplication of the radially displaceable securing means which are present to increase the operational safety preferably includes the securing means being present at least twice and being arranged axially one behind the other. In this case, the term securing means it is to be understood to mean that it can for example comprise an individual radially displaceable ball element in each case or else also a group (distributed over a circumference) of radially displaceable ball elements. The exemplary embodiments described below are concerned with solutions in which two groups of radially displaceable ball elements are present in each case, which are arranged axially one behind the other and each distributed over a circumference. The forces to be captured are therefore distributed to at least two securing means or always to a multiplicity of ball elements. Particularly with such solutions it must however be considered, as mentioned above, that a mechanically secure coupling between the press tool and the exchangeable head in a non-operationally-safe position, in which only one group of radially displaceable ball elements is engaged, is not at all possible. That is the case for both exemplary embodiments shown.

Both exemplary embodiments are of such a type that no mechanically secure coupling or latching at all can be produced between the press tool and the exchangeable head in a non-operationally-safe assembly position. As pressing pressure build-up additionally takes place only relatively slowly by means of a press piston in press tools of this type, the exchangeable head itself would simply be pressed out of the holding part on the press device if inadvertently commissioned, and there is no danger whatsoever for the operating personnel.

The exchangeable head of a quick coupling system of this type can therefore be shaped particularly simply in terms of design. Namely, it only requires two retaining grooves arranged axially one behind the other on the shank part of the exchangeable head, which can be inserted into a holding part of the press tool, which at the same time has the advantage of being simple to produce. The retaining grooves can advantageously extend over the entire circumference, if appropriate however also only over parts of the circumference of the shank part. They can, if required, of course also be realised simply as fittingly arranged individual recesses.

Quick coupling systems of this type can of course be used not just on electrically, pneumatically, mechanically or hydraulically operated press devices; they are just as suitable for manually operated press devices or for press devices with flexible connections to the movable press piston.

As mentioned at the beginning, other quick coupling systems which comprise securing-means arrangements in the form of a bayonet closure system are likewise possible. Bayonet closure systems include a latching device which can be actuated by means of rotation. Although the capturing of relatively large forces tends to be easier in the case of bayonet closures, it must also here possibly be ensured using suitable means, that an unintentional and incomplete latching of the bayonet closure does not lead to safety problems.

The term "securing-means arrangement" is to be understood broadly in this context. Irrespective of whether an exchangeable head is fastened on a press tool by means of a thread, a bayonet closure or with the aid of radially displaceable securing means, they are to be understood to mean those means which should ensure secure fastening. In the case of screw connections and to a large extent also in the case of bayonet closures, this takes place in the main by means of the type of connection per se. In solutions with radially displaceable securing means, further components are of course added, such as for example the latch 2 and the spring 9.

Figure 2:
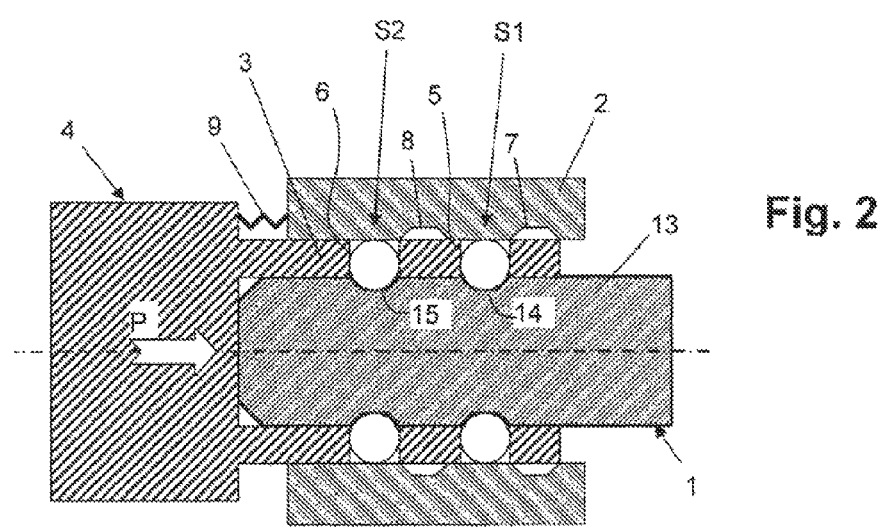
Figure 3:
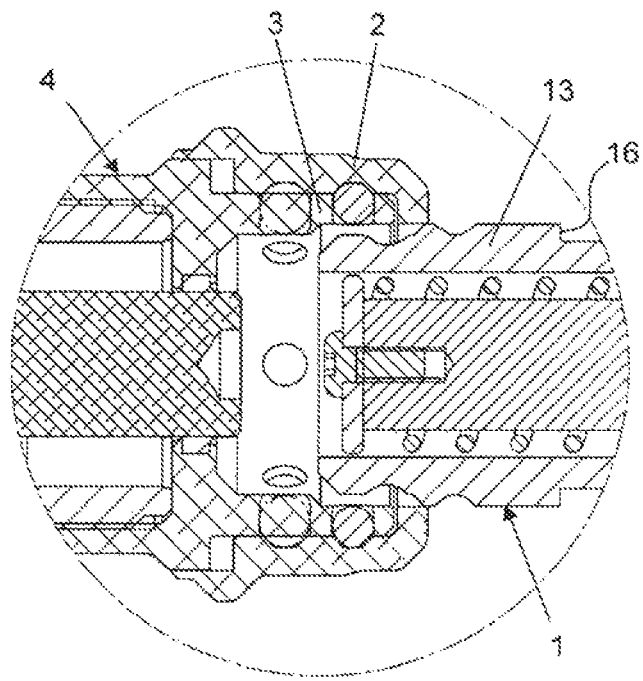
Figure 4:
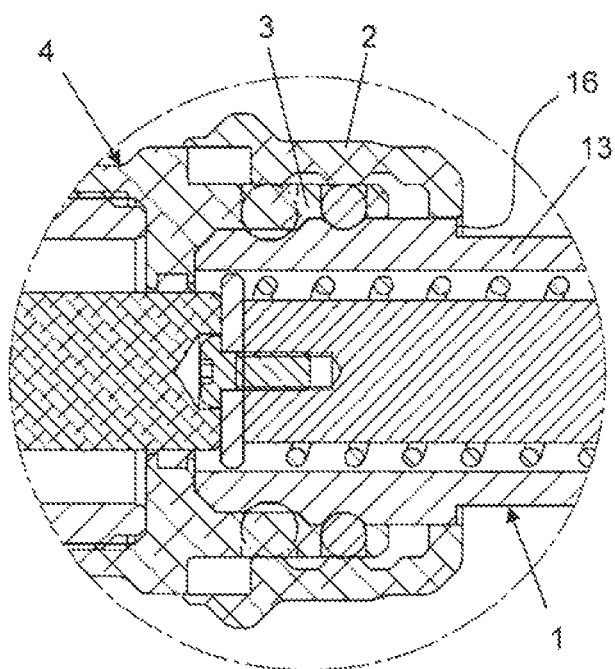

Two exemplary embodiments of the invention with radially displaceable securing means which fulfil the requirements previously explained in general terms are explained in more detail in the following on the basis of drawings. In the figures, FIG. 1 shows a first exemplary embodiment of a quick coupling system according to the invention with inserted exchangeable head, FIG. 2 shows a second exemplary embodiment of a quick coupling system according to the invention with inserted exchangeable head, FIG. 3 shows an indication device in the case of an exchangeable head which is not completely inserted and not locked, and FIG. 4 shows the indication device of FIG. 3 with a completely inserted and locked exchangeable head.

FIG. 1 shows a first exemplary embodiment of a quick coupling system according to the invention with inserted exchangeable head on the basis of a sectional drawing.

In this case, a shank part 13 of an exchangeable head 1 is inserted completely into a securing-means holding part 3 on a press tool 4 and latched therein. A latch 2, which is axially displaceable on the securing-means holding part 3 and is pushed forwards (that is to say away from the press tool) by a spring (not illustrated), is used for latching.

A securing-means arrangement includes securing means S1, S2 in the form of ball elements which are arranged in a radially displaceable manner in ball channels 5, 6 in the securing-means holding part 3.

The securing means S1, S2 are here constructed as two groups of radially displaceable ball elements (in each case distributed over a circumference). The two groups use ball elements of different diameter.

As can be seen from FIG. 1, the securing-means holding part 3 has stepped internal radii, namely an (outer) region with a larger internal radius in the region of the ball channels 5, and an (inner) region with a smaller internal radius in the region of the ball channels 6.

If the latch 2 is in the latching position shown, then the securing means S1, S2 are pressed into corresponding retaining grooves 14, 15 in the shank part 13 of the exchangeable head 1 and thus effect the secure and reliable latching or locking of the exchangeable head. Incorrect assembly is not possible owing to the different sizes of the ball elements, as an attempt to assemble in a position in which only the securing means S1 are in engagement does not result in a secure connection between the press tool and exchangeable head.

If the latch 2 is in the release position (not illustrated), the securing means S1, S2 can switch to the retaining grooves 7, 8 and the exchangeable head 1 can be pulled out of the securing-means holding part 3.

During operation, a hydraulically, pneumatically, mechanically or electrically actuated press piston 10 of the press device 4 acts with a press force P on a spring mounted push rod 12 in the interior of the exchangeable head 1. In this case, the push rod is used for actuating a press apparatus in the exchangeable head.

FIG. 2 schematically shows a second exemplary embodiment of a quick coupling system according to the invention with inserted exchangeable head on the basis of a sectional drawing.

Here also, a shank part 13 of an exchangeable head 1 is inserted completely into a securing-means holding part 3 on a press tool 4 and latched therein. A latch 2, which is axially displaceable on the securing-means holding part 3 and is pushed forwards (that is to say away from the press tool) by a spring 9, is used for latching.

A securing-means arrangement includes securing means S1, S2 in the form of ball elements which are arranged in a radially displaceable manner in ball channels 5, 6 in the securing-means holding part 3.

The securing means S1, S2 are here also constructed as two groups of radially displaceable ball elements (in each case distributed over a circumference). The two groups use ball elements of the same diameter in this case, however.

As can be seen from FIG. 2, the securing-means holding part 3 does not have any stepped internal radii here, however, but rather a constant internal radius in the entire holding region.

If the latch 2 is in the latching position shown, then the securing means S1, S2 are pressed into corresponding retaining grooves 14, 15 in the shank part 13 of the exchangeable head 1 and thus effect the secure and reliable latching or locking of the exchangeable head. Incorrect assembly is not possible in spite of their same size of the ball elements and in spite of the same internal radius of the securing-means holding part, as an attempt to assemble in a position in which only the securing means S1 are in engagement does not result in a secure connection between the press tool and exchangeable head, because the latch 2 in this position cannot be pushed into the latching position illustrated at all. The part of the shank part 13 projecting into the securing-means holding part 3 is namely dimensioned or elongated in such a manner that the securing means S2 do not switch and thus also cannot release the latch for displacement.

If the latch 2 is in the release position (not illustrated), the securing means S1, S2 can switch to the retaining grooves 7, 8 and the exchangeable head 1 can be pulled out of the securing-means holding part 3.

In contrast with the first exemplary embodiment and for simplification, the means for transmitting the pressing force are not illustrated here. Here also, during operation, a hydraulically, pneumatically, mechanically or electrically actuated press piston (not illustrated) of the press device 4 acts with a press force P on a spring mounted push rod (not illustrated) in the interior of the exchangeable head 1, which for its part is used for actuating a press apparatus in the exchangeable head.

Both exemplary embodiments therefore show solutions in which the securing-means arrangement has radially displaceable securing means S1, S2, wherein the securing means S1, S2 for increasing the securing effect are present at least twice and arranged axially behind one another, specifically so that the securing-means arrangement makes a mechanically secure coupling between the press tool 4 and the exchangeable head 1 impossible in a non-operationally-safe position. Thus, with the multiplication or at least doubling and axial connection one behind the other of the securing means S1, S2, the required operational safety and at the same time of course the primarily intended quick coupling possibility between press tool and exchangeable head can be achieved.

Of course, further design solutions for securing-means arrangements with radially displaceable securing means are possible. Thus, it is for example possible that the securing means are not spherical, but rather shaped in a bolt- or cam-like manner, and it is also possible that the securing means are present more than twice.

The FIGS. 3 and 4 finally show another realisation option for visually indicating correct and safe assembly of the device, that is to say of the press tool 4 and exchangeable head 1.

FIG. 3 shows an indication device of this type in the case of an exchangeable head which is not completely inserted and not locked. The quick coupling system illustrated here in principle corresponds to that according to FIG. 1. In contrast with the illustration according to FIG. 1, the shank part 13 of the exchangeable head 1 has a clearly defined and clearly visible marking shoulder 16. The marking shoulder 16 is located clearly outside of the securing-means holding part 3 and the latch 2, specifically even if the latter is pushed forwards to the maximum.

FIG. 4 shows the indication device of FIG. 3 with a completely inserted and locked exchangeable head. The marking shoulder 16 is now located clearly inside the latch 2, which is pushed forwards (in the locking position), and therefore cannot be seen and also can no longer be touched. The user can recognise this as confirmation that the device is now assembled in an operationally safe manner.

Of course, in addition to the, in design terms, particularly simple solution shown, there are further realisation options for the indication device. Thus for example, a red warning marking applied on the shank part 13 instead of the marking shoulder could become invisible in the case of correct assembly, or a green indication field appearing in a window could be provided for further clarification.

LIST OF REFERENCE SYMBOLS

1 Exchangeable head
2 Latch
3 Securing-means holding part
4 Press tool
5 Ball channel
6 Ball channel
7 Accommodation groove
8 Accommodation groove
9 Spring
10 Press piston
11 (not used)
12 Push rod
13 Shank part
14 Retaining groove
15 Retaining groove
16 Marking shoulder
S1 Securing means
S2 Securing means
P Pressing force

The invention claimed is:

1. A device having an unthreaded quick coupling system for fastening an exchangeable head to a press tool, the device comprising:
   an exchangeable head having a shank portion; the shank portion having a marking shoulder formed on an exterior surface;
   a press tool having a holding portion for at least two radially-displaceable securing elements and a press piston, the press piston moveable in an axial direction to actuate a press apparatus in the exchangeable head;
   at least two radially-displaceable securing elements axially arranged one behind the other on the holding portion of the press tool, the securing elements making a mechanically-secure coupling between the exchangeable head and the press tool impossible in a non-operationally-safe position; and
   a latch axially-displaceable on the holding portion of the press tool;
   wherein, when the shank portion of the exchangeable head is completely inserted into the holding portion of the press tool, the marking shoulder is positioned within the latch and no longer visible indicating that coupling between the exchangeable head and the press tool is secure.

2. The device according to claim 1, wherein the exchangeable head further comprises at least two retaining grooves axially arranged one behind the other on the shank portion, the retaining grooves configured for holding the radially-displaceable securing elements.

3. The device according to claim 1, wherein the exchangeable head further comprises a colored warning marking for visually indicating correct and operationally-safe fastening of the exchangeable head to the press tool.

* * * * *